DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 398

T914,003

FLEXIBLE, EPOXY-COATED DIELECTRIC

Richard Winthrop Bradt, Jr., Richmond, Va., assignor to E. I. du Pont de Nemours and Company, Wilmington, Del.

Continuation of application Ser. No. 76,976, Sept. 30, 1970. This application May 22, 1972, Ser. No. 255,698

Int. Cl. B32b *27/08*

U.S. Cl. 117—138.8 F

No Drawing. 10 Pages Specification

A dielectric of a flexible film base of a polyester or a polyamide coated on at least one side with a polyepoxide cured with an anhydride and optionally containing an inorganic filler such as talc. This dielectric is particularly useful for high temperature applications in insulating coils in electric motors, e.g. slot liners and phase liners, and for use as a base in preparing printed circuits.